United States Patent
Blom et al.

(10) Patent No.: US 9,106,409 B2
(45) Date of Patent: Aug. 11, 2015

(54) METHOD AND APPARATUS FOR HANDLING KEYS USED FOR ENCRYPTION AND INTEGRITY

(75) Inventors: Rolf Blom, Järfälla (SE); Karl Norrman, Stockholm (SE); Mats Näslund, Vällingby (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 1602 days.

(21) Appl. No.: 11/726,527

(22) Filed: Mar. 22, 2007

(65) Prior Publication Data
US 2007/0230707 A1 Oct. 4, 2007

Related U.S. Application Data

(60) Provisional application No. 60/786,478, filed on Mar. 28, 2006.

(51) Int. Cl.
*H04L 9/08* (2006.01)
*H04L 29/06* (2006.01)
*H04W 12/04* (2009.01)

(52) U.S. Cl.
CPC ............ *H04L 9/0844* (2013.01); *H04L 9/0891* (2013.01); *H04L 63/062* (2013.01); *H04L 2209/80* (2013.01); *H04W 12/04* (2013.01)

(58) Field of Classification Search
USPC .................................................. 380/277–284
See application file for complete search history.

(56) References Cited

U.S. PATENT DOCUMENTS 6,031,912 A * 2/2000 Moulart et al. ................. 380/44
6,279,004 B1 * 8/2001 Lee et al. ...................... 707/695

(Continued)

FOREIGN PATENT DOCUMENTS

EP  1 102 157 A1  5/2001
JP  2003525556 A  8/2003

(Continued)

OTHER PUBLICATIONS

International-Type Search Report for Swedish Application No. 0600695-1 mailed Nov. 24, 2006.

(Continued)

*Primary Examiner* — Eleni Shiferaw
*Assistant Examiner* — Phy Anh Vu
(74) *Attorney, Agent, or Firm* — Patent Portfolio Builders PLLC

(57) ABSTRACT

A method and an arrangement for providing keys for protecting communication between a terminal (300) and service points in a communication network. A basic key (Ik) is first established with a service control node (304) when the terminal has entered the network. An initial modified key ($Ik_1$) is then created in both the service control node and the terminal, by applying a predetermined first function (f) to at least the basic key and an initial value of a key version parameter (v). The initial modified key is sent to a first service point (302), such that it can be used to protect communication between the terminal and the first service point. When the terminal switches to a second service point (306), the first service point and the terminal both create a second modified key ($Ik_2$) by applying a predetermined second function (g) to the initial modified key, and the first service point sends the second modified key to the second service point.

23 Claims, 4 Drawing Sheets

(56) References Cited

U.S. PATENT DOCUMENTS

| | | | |
|---|---|---|---|
| 6,453,159 B1* | 9/2002 | Lewis | 455/411 |
| 7,024,553 B1* | 4/2006 | Morimoto | 713/163 |
| 7,787,626 B2* | 8/2010 | Brown et al. | 380/273 |
| 7,873,956 B2* | 1/2011 | Kim et al. | 717/168 |
| 7,961,884 B2* | 6/2011 | Edgett et al. | 380/277 |
| 8,537,779 B2* | 9/2013 | Wu | 370/331 |
| 2003/0039234 A1* | 2/2003 | Sharma et al. | 370/338 |
| 2003/0051140 A1* | 3/2003 | Buddhikot et al. | 713/169 |
| 2004/0146164 A1* | 7/2004 | Jonas et al. | 380/284 |
| 2005/0005095 A1 | 1/2005 | Meandzija et al. | |
| 2005/0031126 A1* | 2/2005 | Edney et al. | 380/278 |
| 2006/0205388 A1 | 9/2006 | Semple et al. | |
| 2007/0189201 A1* | 8/2007 | Feder et al. | 370/328 |

FOREIGN PATENT DOCUMENTS

| | | |
|---|---|---|
| JP | 2005159495 A | 6/2005 |
| JP | 2005-236490 A | 9/2005 |
| JP | 2005236490 A | 9/2005 |
| JP | 2005531982 A | 10/2005 |
| WO | WO 03/049357 A2 | 6/2003 |
| WO | WO 03/107584 A1 | 12/2003 |
| WO | 2006/044717 A2 | 4/2006 |

OTHER PUBLICATIONS

Japanese Office Action in corresponding Japanese Application No. 2009-502719 mailed on Apr. 16, 2012.
Korean Office Action in related Korean Application No. 10-2008-7024809 dated Apr. 15, 2014. (The Attached translation is a summary translation provided by the KR Foreign Associate).

* cited by examiner

METHOD AND APPARATUS FOR HANDLING KEYS USED FOR ENCRYPTION AND INTEGRITY

TECHNICAL FIELD

The present invention relates generally to a method and apparatus for providing keys for protecting communication between a terminal and service points in a communication network.

BACKGROUND

In wireless communication, security is an important issue since conveying information over the air makes it possible to illicitly intercept and/or modify the communicated information. Therefore, the information is typically encrypted and/or integrity protected before being sent over the air. The prevailing communication standards of today for radio communication involves various security methods and routines. For example, mobile (or cellular) access networks according to GSM (Global System for Mobile communications), GPRS (General Packet Radio Service) and UMTS (Universal Mobile Telecommunications System) utilise two keys referred to as Ck and Ik, to ensure integrity and for encrypting information communicated over radio channels between a particular mobile terminal and the mobile network.

In UMTS, each mobile terminal shares a unique pair of keys Ck and Ik with the network which can be used for encrypting payload data as well as various signalling messages, and also for verifying the identity of the terminal, referred to as integrity. The keys Ck and Ik to be used in a session are established during a registration stage when the terminal attaches to the network, which will be referred to as key agreement in this description. It should be noted that a mobile terminal can be in two different modes referred to as the idle mode when it has been registered as present in the network but is not involved in a session of transmitting/receiving data, and the active mode when it transmits/receives data in a session.

The information communicated over the air between a mobile terminal and a base station is conventionally divided into three main categories: 1) payload data, also referred to as "user plane" data, 2) NAS (Non-Access Stratum) signalling which is information related to, e.g., security including authentication and encryption, and 3) RRC (Radio Resource Control) which is information related to radio communication including channel specifics, modulation and multiplexing schemes, power regulation, signal measurements, etc.

In so-called 3G-systems according to UMTS, the user plane data is typically conveyed over four different nodes in the access network: the base station (also referred to as NodeB), the RNC (Radio Network Controller) the SGSN (Serving GPRS Support Node) and the GGSN (Gateway GPRS Support Node), of which the base stations and RNC constitute a radio network part and the SGSN and GGSN constitute a core network part. In 3G systems, all encryption/decryption of user plane data, NAS and RRC is executed by the RNC and the terminal, whereas in traditional GSM systems, the encryption is handled by the base stations.

Currently, a new network architecture is being developed to provide so-called "evolved 3G access", as illustrated in FIG. 1, based on 3GPP (Third Generation Partnership Project). The new architecture basically comprises two node types including "evolved" base stations 100 in the radio network part connected to a central access control gateway AGW 102 in the core network part by means of the well-known S1 interface. An access network may contain plural AGW nodes serving different geographic areas. The AGW node is connected to various different external networks 104 using well-known interfaces, including the Internet (using the Gi interface), other 3GPP networks (using the Gn interface) and non-3GPP networks (using the S2 interface), and includes certain functions similar to those currently implemented in the RNC, SGSN and GGSN.

In particular, security processing related to encryption and integrity will take place in the base station 100 and the AGW node 102. Basically, the encryption of user plane data, and potentially also the NAS signalling, will be handled by the AGW node 102, whereas the protection of the RRC signalling will be handled by the base stations 100. The initial process of authenticating the subscriber and key agreement will take place between a SIM (Subscriber Identity Module) in the terminal and the AGW node, and is often referred to as AKA (Authentication and Key Agreement). Thus, the above-mentioned keys Ck and Ik may be established by the terminal and the AGW node during the AKA process.

In order to provide interoperability between different network architectures, it is highly desirable that security components and routines of existing 3G systems can be reused in the above-described two-node architecture as well, including maintaining the AKA process. Consequently, there is a need to provide security keys for both the base station and the AGW node, preferably based on the above keys Ck and Ik. In the base station a key is needed to protect the RRC signalling, and in the AGW node a key is needed to protect the NAS signalling as well as the user plane data.

Although it would be possible to send a copy of, e.g., Ik to the base station and use the same key in both the base station and the AGW node, this may result in certain drawbacks. Firstly, a local base station is somewhat vulnerable to illicit attacks by being typically situated at easily accessed and unguarded places, as compared to the more centralized AGW node which can be installed wholly protected. Therefore, there is a risk that the Ik key is intercepted at the base station such that the NAS signalling can be illicitly detected. It should be noted in this context that the sensitive NAS information generally demands a higher degree of security than the RRC information. However, the RRC signalling may include a terminal identifier which makes it desirable to protect anyway.

Secondly, it may be difficult to obtain satisfactorily protection for the case when intercepted information is recorded and replayed later (so-called replay attacks), if the same key is used for two different purposes which provides plural opportunities to detect the used key. Therefore, if Ik is reused in the base station, it is required that the AGW node at least applies some one-way function f to Ik before sending it in a thus modified form $f(Ik)=Ik'$ to the base station.

However, if Ik' is intercepted at a base station during a session, this security flaw will persist even if the session is handed over to a new base station, i.e. as long as Ik' is used. This problem can be avoided if the AKA process is repeated at regular intervals (e.g. triggered by hand-over), which however may disturb the session, thus significantly impacting a desirable seamless behaviour of services.

It is therefore desirable to avoid persistent insecurity following a key interception as the terminal moves between different service points, i.e. base stations, yet without requiring extra operations such as the establishment of new keys in a re-authentication according to the AKA process. An attempt to meet these objects has been made involving a new type of key that is shared between the base station and the AGW node, according to a proposed procedure described below with reference to FIG. 2.

FIG. 2 illustrates a mobile terminal 200 and a mobile access network including a plurality of base stations of which two are shown, BS1 202 and BS2 204, which are connected to a central AGW node 206, in accordance with the two-node architecture shown in FIG. 1. In this proposal, each base station in the network covered by the AGW node 206 share a predefined key with the AGW node. As indicated in the figure, base stations 202 and 204 thus share predefined keys k1 and k2, respectively, with AGW node 206.

First, terminal 200 attaches to the network by radio connection with BS1 202, thereby being the serving base station, and the conventional keys Ck and Ik are established by means of the AKA process, in a first step 2:1.

In order to establish further protection, the AGW node 206 will then look up the key k1 of BS1. Furthermore, the AGW node will also look up the corresponding key of a suitable number of "neighbouring" base stations, i.e. base stations located in the neighbourhood of the serving base station BS1 to which the terminal might be handed over to when moving during a session, including BS2 204. The neighbouring base stations should be selected as covering a reasonable area in which the terminal is expected to be. Around 5-10 base stations may be considered as neighbouring base stations, e.g. depending on their cell sizes.

Next, the AGW node 206 uses the Ik key established for the terminal 200, to create a modified key specifically for each base station, by applying a predetermined function f with the Ik key and a base station identity "BS" as input, as follows: $Ik_1=f(Ik, \text{"BS1"})$ is created for BS1, $Ik_2=f(Ik, \text{"BS2"})$ is created for BS2, and in general, $Ik_j=f(Ik, \text{"BSj"})$ is created for base station j. It should be noted that the predetermined function f is also known to the terminal, which will be utilised as described below.

Each produced modified Ik key $Ik_1, Ik_2 \ldots Ik_j$ is then "wrapped" (i.e. encrypted) by the key k shared with the corresponding base station, altogether making up a set of individually wrapped keys for all base stations (the serving one and the neighbouring ones): $Encr(k1, Ik_1), Encr(k2, Ik_2) \ldots Encr(kj, Ik_j)$. In the following, "K" will be used for short to represent the complete set of all these wrapped keys. The whole process of creating K as described above is illustrated by a step 2:2 in the figure.

According to the proposed procedure, the AGW node 206 now transfers the entire key-set K to the serving base station BS1 202, in a following step 2:3. BS1 can then decrypt the component of K corresponding to $Encr(k1, Ik_1)$ using its unique key k1, to extract the above-mentioned modified Ik key $Ik_1$ originally created for that base station, in a next step 2:4, to be shared with the terminal. BS1 also stores the entire key-set K for future use.

Since the terminal naturally knows its original Ik key and the identity of the serving base station "BS1", it can derive the same modified Ik key $Ik_1$ by applying the function f: $Ik_1=f(Ik, \text{"BS1"})$, in connection with starting a communication session, as shown in step 2:5. Hence, a modified key $Ik_1$ has now been established that is unique for this particular combination of terminal and base station, based on the terminal-unique key Ik and base station-unique identity "BS1". The key $Ik_1$ can now be used by terminal 200 and base station 202 to protect the RRC signalling during the session, as long as terminal 200 stays connected to base station 202.

If the terminal at some point during the session moves to be handed over to a new base station, in this case BS2 204 as illustrated by the dashed arrow, the old BS1 202 transfers the entire key-set K to BS2 204, in a step 2:6. Using the received key-set K, BS2 204 can similarly extract its own modified Ik key $Ik_2$ in a step 2:7. The terminal will also derive $Ik_2$ using the function $f(Ik, \text{"BS2"})$, in a step 2:8, to be used as a key for encryption and/or integrity in further communication.

The above-described proposed procedure of establishing a modified Ik key can also be used to establish a modified Ck key that is unique for each particular combination of terminal and base station, in order to provide more reliable protection of user plane communication and the sensitive NAS signalling.

Thus, the above-described prior art solution provides keys unique to each base station-terminal combination. Even if at some point a key $Ik_x$ used in one cell x (i.e. base station) is illicitly intercepted, a new key $Ik_y$ will be used instead as soon as a hand-over occurs to another cell y, and the security flaw does not persist. Hence, the solution in FIG. 2 provides backwards as well as forwards security whenever the serving base station is changed.

However, there are some significant problems associated with the above solution. It is generally quite complex since new Ik keys must be calculated and wrapped for a significant number of base stations of which only a few will be used, if any at all. Further, the AGW node needs to "predict" which base stations that might possibly be involved in future handovers, which is more or less haphazard as the terminal may move in unexpected directions. If the terminal swiftly moves out of the area covered by the collection of selected neighbouring base stations included in key-set K, the process must start all over again to obtain a key-set K for a new area. Moreover, serving base stations are required to store the entire key-set K, and not only its "own" key, and to transfer it to the next base station upon hand-over.

It is generally desirable to obtain a simple yet reliable way of using keys for encryption and/or integrity protection, particularly when a communication terminal switches communication from one service point to another service point. More specifically, it would be beneficial to avoid the need for hand-over predictions and to reduce the number of keys that must be handled by base stations or other service points. It is also desirable to provide backward security when switching service points, and forward security when a terminal starts a session, e.g. goes from idle mode to active mode, with a minimum of service impact.

Although the background description above has been focused on mobile terminals using base stations in a 3G network as service points, the discussed issues may be relevant for other mobile (or cellular) access networks as well, and also for fixed access networks using wired connections such as DSL (Digital Subscriber Line), PON (Passive Optical Network) and DOCSIS (Data Over Cable Service Interface Specification). For example, the above-mentioned AKA process may thus be replaced by other similar processes for establishing one or more keys to be used in session communications, depending on the prevailing network routines. Further, viewing "access" or "connectivity" as a general service, the present invention can also be applied to other communication services, e.g. data streaming, etc.

SUMMARY

It is an object of the present invention to generally address the problems and demands outlined above, and to provide a convenient mechanism for obtaining keys for protecting communication between a terminal and service points in a communication network.

This object and others can be obtained by methods and arrangements, respectively, according to the attached independent claims.

In the present invention, a method and an arrangement are defined for providing keys for protecting communication between a terminal and service points in a communication network, as implemented in a service control node. A basic key is first established for the terminal during a registration procedure when the terminal has entered the network. An initial modified key is then created by applying a predetermined function to at least the basic key and an initial value of a key version parameter, when the terminal starts a first communication session. The initial modified key is sent to a first service point to which the terminal is initially attached, such that it can be used to protect communication between the terminal and the first service point.

At a later stage, a key request may be received from a new service point to which the terminal is attached, e.g. when the terminal enters an active state after a period in idle state. In response thereto, a new initial modified key is created by applying said function to at least the basic key and an updated value of said key version parameter, when the terminal starts a second communication session. The new initial modified key is finally sent to the new service point, such that it can be used to protect communication between the terminal and the new service point.

A service point identity may also be input to the predetermined function when creating the initial modified key and/or new initial modified key, to make the key unique for the particular terminal/service point combination.

The value of the key version parameter is initialized to a certain value and then changed according to a predetermined scheme or algorithm each time a new initial modified key is created. For example, the key version parameter may be initialised to zero and then incremented by one each time a new initial modified key is created.

The key request may be received when the terminal is reactivated after being idle, or after the terminal has been active a preset time period, or has communicated a predetermined amount of data, or has made a predetermined number of service point switches.

A method and an arrangement are also defined for obtaining keys for protecting communication with a terminal initially attached to a service point in a communication network, as executed in said service point. In the service point, an initial modified key is first received from a service control node, that has been created by applying a predetermined first function to at least a basic key established for the terminal and an initial value of a key version parameter. When it is detected that the terminal will switch to a second service point during an ongoing session, a second modified key is created by applying a predetermined second function to at least the initial modified key. The second modified key is finally sent to the second service point, such that it can be used to protect communication between the terminal and the second service point.

The service point may send a key request to the service control node to obtain a new initial modified key. The key request may be sent when the terminal is reactivated after being idle, or after the terminal has been active a preset time period, or has communicated a predetermined amount of data, or has made a predetermined number of service point switches.

A method and an arrangement are further defined for obtaining keys for protecting communication with service points in a communication network, as executed in a terminal initially attached to a first service point in the network. A basic key Ik is first determined during a registration procedure when entering the network. An initial modified key is then created by applying a predetermined first function to at least the basic key and an initial value of a key version parameter, when starting a first communication session, such that it can be used to protect communication with the first service point. If the terminal then switches to a second service point, a second modified key is created by applying a predetermined second function to at least the initial modified key.

If the terminal attaches to a new service point after an idle period in order to start a second communication session, a new initial modified key is created by again applying the first function to at least the basic key and an updated value of said key version parameter, such that it can be used to protect communication with the new service point.

A service point identity may also be input to the predetermined function when creating the initial modified key and/or new initial modified key, to make the key unique for the particular terminal/service point combination.

The value of the key version parameter is first initialized to a certain value and then changed according to a predetermined scheme or algorithm each time a new initial modified key is created. For example, the key version parameter may be initialised to zero and then incremented by one each time a new initial modified key is created.

BRIEF DESCRIPTION OF THE DRAWINGS

The present invention will now be described in more detail and with reference to the accompanying drawings, in which.

DESCRIPTION OF PREFERRED EMBODIMENTS

Figure 1:
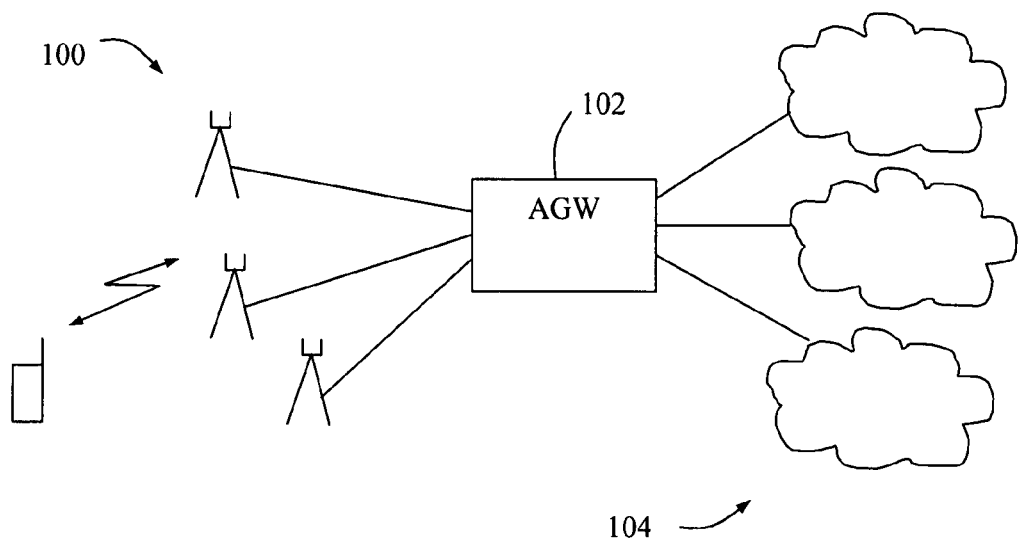
FIG. 1 is a schematic view illustrating a mobile network architecture according to a previously known proposed evolved 3G access for mobile communication, in which the present invention can be used.

An embodiment of the present invention will now be described initially with reference to FIG. 3A which is a signalling diagram illustrating a first phase in a procedure of handling keys for encryption and/or integrity in a communication access network, e.g. the mobile access network shown in FIG. 1.

Figure 3A:
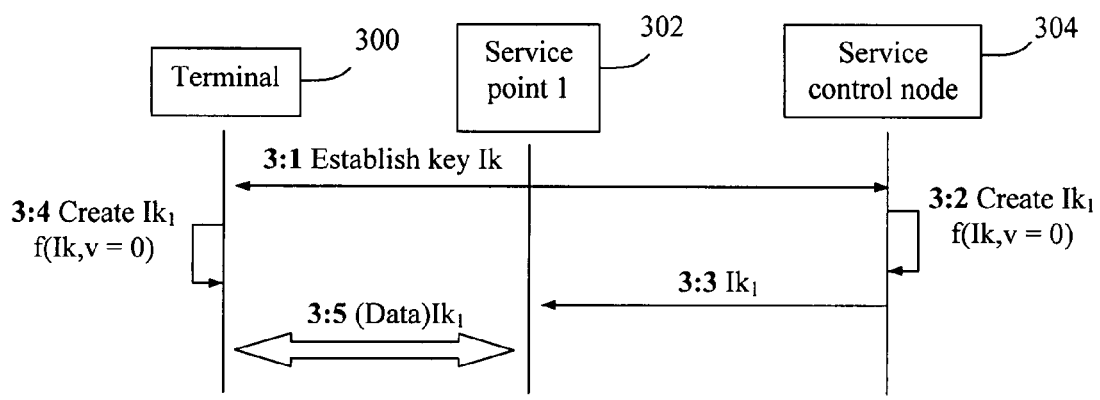
FIG. 3A is a signalling diagram illustrating a procedure of handling keys, according to one embodiment.

FIG. 3A illustrates a communication terminal 300, a first service point 302 and a service control node 304 to which the first service point 302 is connected, as well as a plurality of other service points (not shown). In practice, the terminal 300 may be a mobile terminal, the first service point 302 may be a base station, and the service control node 304 may be an AGW, as previously described. In this description, the term "service control node" may generally represent any central network node, e.g. in a core network, controlling a telecommunication service that is executed when the terminal is connected to a service point.

A first step 3:1 illustrates that at least one basic key for encryption and/or integrity is established between terminal 300 and service control node 304, e.g. according to a conventional routine such as the AKA procedure when a mobile terminal is initially attached to a base station, i.e. service point 302. This basic key is here denoted Ik in analogy with the proposed procedure of FIG. 2, even though other keys such as Ck may also be used in the present solution. Moreover, the present solution can be applied for any number of keys that may be employed for different purposes, such as encryption, integrity, authentication, etc., but only one key Ik will be described in this embodiment for simplicity.

Figure 2:
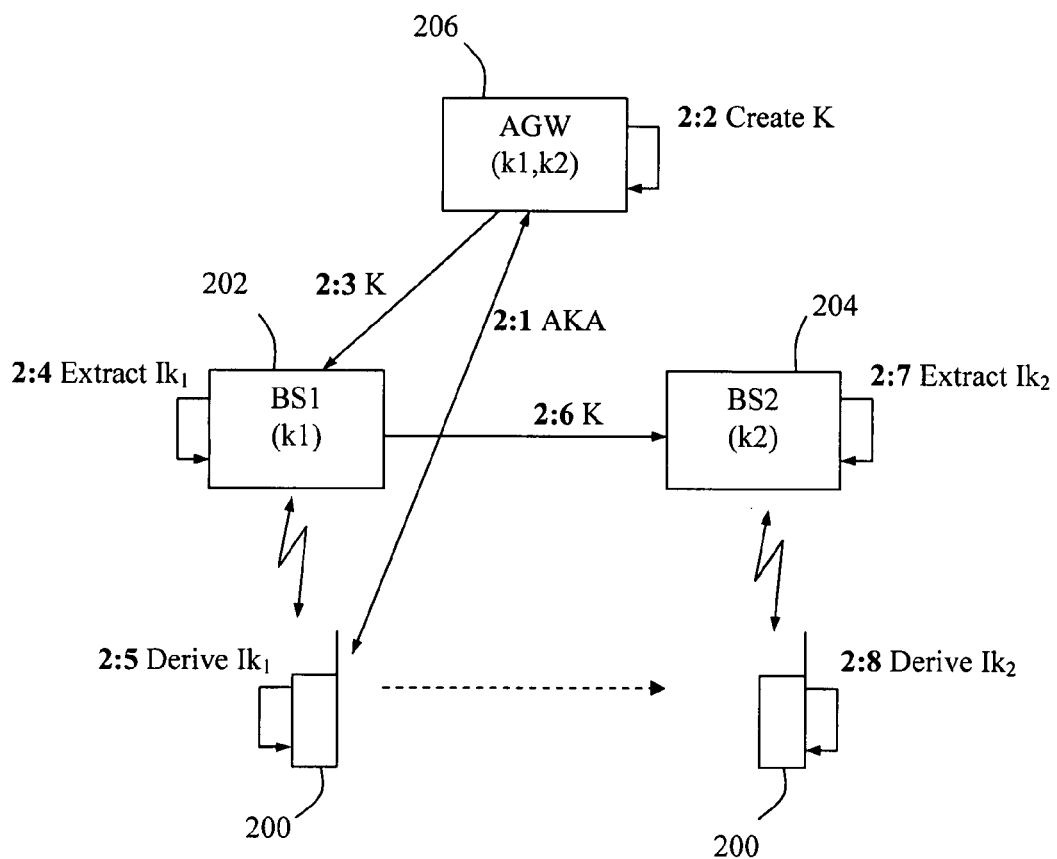
FIG. 2 is a schematic block diagram illustrating a proposed procedure of handling keys in the network architecture shown in FIG. 1, according to the prior art.

As illustrated by a next step 3:2, service control node 304 creates an initial modified key $Ik_1$ by applying a first predetermined function f to at least the original key Ik and optionally also a service point identity "SP1" to make the key $Ik_1$ unique for this terminal/service point combination, as similar to the creation of modified keys in the proposal of FIG. 2. Other parameters may also be used here as input to function f, such as further basic keys (e.g. Ck) and a terminal identity, which is however outside the scope of the present invention.

In the present solution, a key version parameter v is introduced as additional input to the function f to indicate the current version of the initial modified key $Ik_1$, such that $Ik_1$=f (Ik, v). As mentioned above, "SP1" and/or other parameters may also be used as input to function f. The value of the key version parameter v will be changed according to a predetermined scheme each time a modified key $Ik_1$ is created as described below, here indicated as v, v', v", v'", etc. For example, the key version parameter v may be initialised to v=0 (zero) and then simply incremented by one such that v'=1, v"=2, v'"=3, etc, which is used in the present embodiment. However, the value of the key version parameter v may be changed according to any conceivable scheme or algorithm, and the present solution is not limited in this respect. It should be noted that the current value of parameter v and the function f should be known to both the terminal 300 and the service control node 304.

Returning to FIG. 3A, service control node 304 sends the initial modified key $Ik_1$ to service point 302 in a next step 3:3, for use in any forthcoming communication with terminal 300. At the same time, terminal 300 can derive the same initial modified key $Ik_1$ by applying the function f(Ik, v) in connection with starting a communication session, as illustrated by a step 3:4. It should be noted that terminal 300 may execute step 3:4 any time after step 3:1, i.e. independent of steps 3:2 and 3:3. The key $Ik_1$ can now be used by terminal 300 and service point 302 to protect any communication during the session, as long as terminal 300 stays connected to service point 302, which is illustrated by a step 3:5. In this step, "(Data)$Ik_1$" generally indicates that communicated data is protected by $Ik_1$.

Broadly speaking, any type of communication can be protected in any manner by means of the obtained key $Ik_1$ depending on the implementation, and the present invention is generally not limited in this respect either. In the case of mobile communication as described in the background section, particularly the RRC signalling is suitable to protect by means of key $Ik_1$.

Furthermore, the key version parameter v is now changed from the initial value v to the next value v' according to the predetermined scheme, after the initial modified key $Ik_1$ has been established and used. Thus, v may change from 0 (zero) to 1 if a simple incrementing scheme is used. The updated parameter v' is then saved in both terminal 300 and service control node 304 for later use in further modified keys, to be explained below. Thereby, the terminal and the service control node are synchronized with respect to parameter v.

Figure 3B:
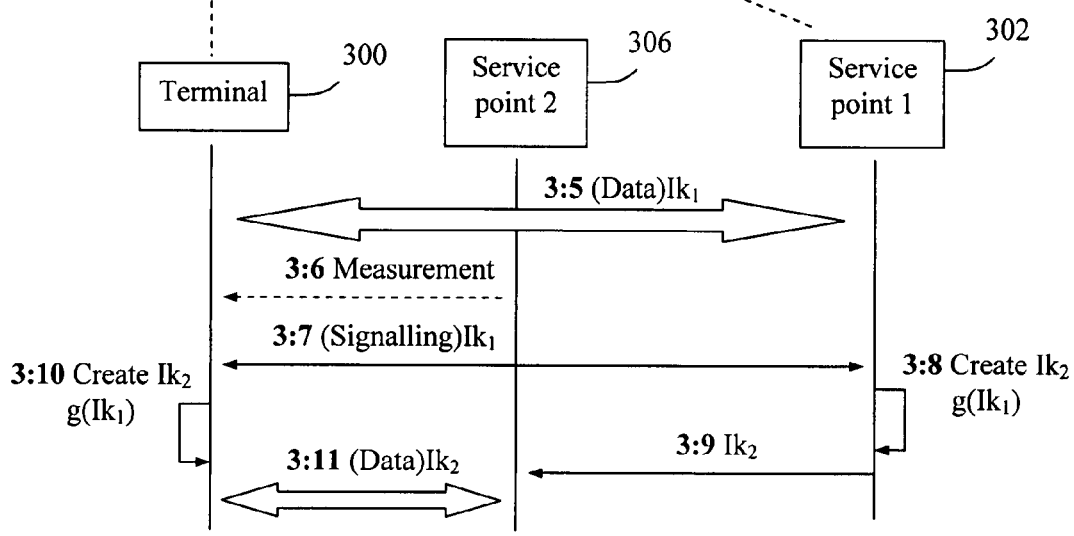
FIG. 3B is a signalling diagram illustrating a procedure of handling keys, continued from FIG. 3A.

The next FIG. 3B is a signalling diagram illustrating a second phase in a continued procedure of handling keys for encryption and/or integrity, following the first phase of FIG. 3A. In FIG. 3B, the terminal 300 switches connection from the first service point 302 to a second service point 306, when active. In the mobile network case, this means that a mobile terminal makes a hand-over from one base station to another. Thus, the terminal is active during the service point switch, i.e. engaged in a communication session where key $Ik_1$ can be used, according to step 3:5 in FIG. 3A as duplicated in FIG. 3B.

For whatever reason, it is thus determined during the ongoing session of step 3:5 that the terminal 300 will switch connection to service point 306. In the mobile network case, mobile terminals conventionally perform radio measurements on signals from neighbouring base stations, in this figure indicated as an optional step 3:6 where terminal 300 measures signals from service point (or base station) 306. The measurements may then indicate that the new base station will provide a better radio connection than the old one, thereby triggering a hand-over. In other cases, it may be determined to switch service point if the service conditions somehow change, e.g. when new services are activated, or if more bandwidth is needed, or if the currently used service point has become overloaded or the like, etc. It may even be the case that handover is made to a different radio access technology, e.g. from one network using 3G cellular to another one using WiMAX or WLAN. As long as the radio networks can be supervised from the same core network/service control node, the present solution is applicable. In that case, an identifier for the access technology may also preferably be included as input to function f such that, e.g., the new $Ik_j$=f(Ik, v, "SPj", "WLAN").

Before the service point switch can be executed, a certain amount of signalling between terminal 300 and the old service point 302 is typically required in preparation for the switch, as illustrated by a next step 3:7. This signalling can be protected by key $Ik_1$ as well, as indicated in step 3:7. In the mobile network case, hand-over signalling is generally a part of the RRC signalling conventionally protected by the basic key Ik according to current standards.

Further, the old service point 302 creates a second modified key $Ik_2$ at this point, as indicated by a step 3:8, by applying a second predetermined function g to at least the previous initial modified key $Ik_1$ such that $Ik_2$=g($Ik_1$). Again, further parameters may be used as input to function g, which however is outside the scope of the present invention. Thus, key $Ik_1$ is further modified into key $Ik_2$ by means of the function g.

The first service point 302 then sends the created key $Ik_2$ to the second service point 306 in a next step 3:9. Preferably, this transmission is protected in some way, which however is outside the scope of the present invention. According to the present solution, the function g is also known to terminal 300 which likewise creates the new modified key $Ik_2$ as indicated by a further step 3:10. It should be noted that step 3:10 may be executed independently of steps 3:8 and 3:9.

Finally, key $Ik_2$ can now be used by terminal 300 and service point 306 to protect the communication during the session, as long as terminal 300 stays connected to service point 306, which is illustrated by a step 3:11.

If the terminal 300 makes further service point switches, the procedure illustrated in FIG. 3B can be repeated such that a chain of modified keys will be used, each key being calculated from the previous one using the second function g: $Ik_3=g(Ik_2)$, $Ik_4=g(Ik_3)$, $Ik_5=g(Ik_4)$, and so forth. The entire chain of keys is originally based on one value of the key version parameter v, in this example the initial value v=0.

In this way, by appropriate choice of the function g, any communication can be protected using different keys at different service points (e.g. base stations) where a later key cannot reveal an earlier one. It should also be noted that if the terminal should return to a service point where it has been earlier in the same session, the new key will be different from the one used earlier with that service point since it is always calculated from the immediate previous key in the chain.

The service control node 304 is only involved in the establishment of the initial modified key $Ik_1$ when the terminal enters an active mode by starting a session, whereas the following keys for that session are handled solely by the terminal and each new service point. This is a much simpler operation as compared to handling plural modified keys for neighbouring base stations according to the proposal of FIG. 2. Moreover, each new key is created independently at both the terminal and the current service point which safely transfers the new key to the next service point, assuming that safe communication links are used between the service points. Hence, no sensitive key-related information is conveyed over the air.

Figure 3C:
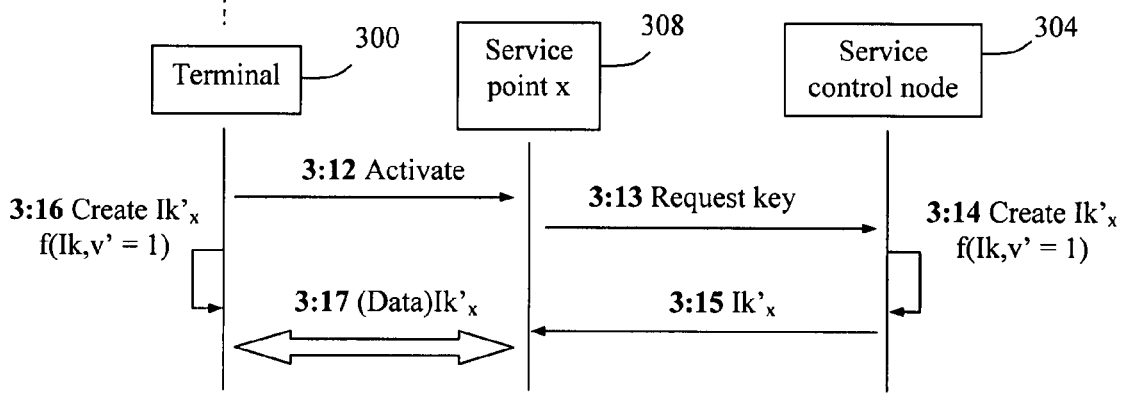
FIG. 3C is a signalling diagram illustrating a procedure of handling keys, continued from FIG. 3B.

The following FIG. 3C illustrates a third phase in the continued procedure of handling keys for encryption and/or integrity, following the second phase of FIG. 3B. This time, it is assumed that terminal 300 has actually completed the session after step 3:11 above and has entered an idle mode (e.g. to save battery power), although it may remain registered as present in the network. For example, in the case of a mobile network the terminal may move around and be connected to various base stations during the idle mode, known as "camping", although without communicating any data. When the terminal is not active, no key is naturally needed for protection and thus no key management operations take place.

In FIG. 3C, the terminal 300 is thus connected to a service point 308 called "x", when entering an active mode by starting a communication session, which is represented by a step 3:12. Since the terminal has already been registered with the service control node 304 earlier in step 3:1 above, the basic key Ik is still valid for the terminal. In order to obtain a useful key for protection of any communication with terminal 300, the service point 308 now sends a key request for the terminal 300 to service control node 304, in a next step 3:13, including a terminal identity. This key request is typically part of a more general "context request" for the terminal in question, according to conventional procedures.

In response thereto, service control node 304 retrieves the basic key Ik and again creates an initial modified key $Ik'_x$ in a step 3:14 by applying the first predetermined function f to at least the basic key Ik and the updated key version parameter v' such that $Ik'_x=f(Ik, v')$. Thereby, the new initial modified key $Ik'_x$ will be different from the one calculated in step 3:2 above. Again, a service point identity "SPx" may optionally also be input to function f to make the key $Ik'_x$ unique for this terminal/service point combination, as well as any other parameters.

It should be noted that even if terminal 300 is reactivated with the same service point 302 as in FIG. 3A, resulting in a key $Ik'_1$, it would still be different from the previous initial modified key $Ik_1$ due to the new value of the key version parameter v'. In a next step 3:15, service control node 304 sends the new initial modified key $Ik'_x$ to service point 308 in response to the key request of step 3:13.

At the same time, i.e. independently of steps 3:13-3:15, terminal 300 performs the same calculation of key $Ik'_x$ based on the updated value v', as indicated in step 3:16. Finally, key $Ik'_x$ can now be used by terminal 300 and service point 308 to protect the communication during the session, as long as terminal 300 stays connected to service point 308, which is illustrated by a step 3:17.

Hence, a new chain of keys has been started based on the updated key version parameter v', in this example v'=1, which will be altogether different from the previous chain. The new chain will be continued in the manner described above for FIG. 3B upon switching service points, as long as the terminal stays active, i.e. is engaged in a session. When the terminal switches from one service point to another, the old one and the terminal can delete their copy of the key. Thus, only one key is managed at a time.

If the terminal stays active for a relatively long period, potentially resulting in decreased security as a new key is frequently calculated based on the previous one, the security can be restored if a new key chain based on an updated key version parameter is triggered, even if the terminal has not been reactivated from idle state. For example, a new initial modified key can be obtained if a current service point sends a key request to the service control node 304 as in step 3:13, which may be triggered after a preset active time period, or after having communicated a predetermined amount of data, or after a predetermined number of service point switches, or according to any other specified criteria. The triggering may be initiated by the current service point or alternatively by the terminal. The key version parameter will be reset to its initial value after the terminal has been deregistered with the network (e.g. when powered off) and is registered afresh, or when a re-authentication takes place. Another basic key Ik may then be established for the terminal.

Figure 4:
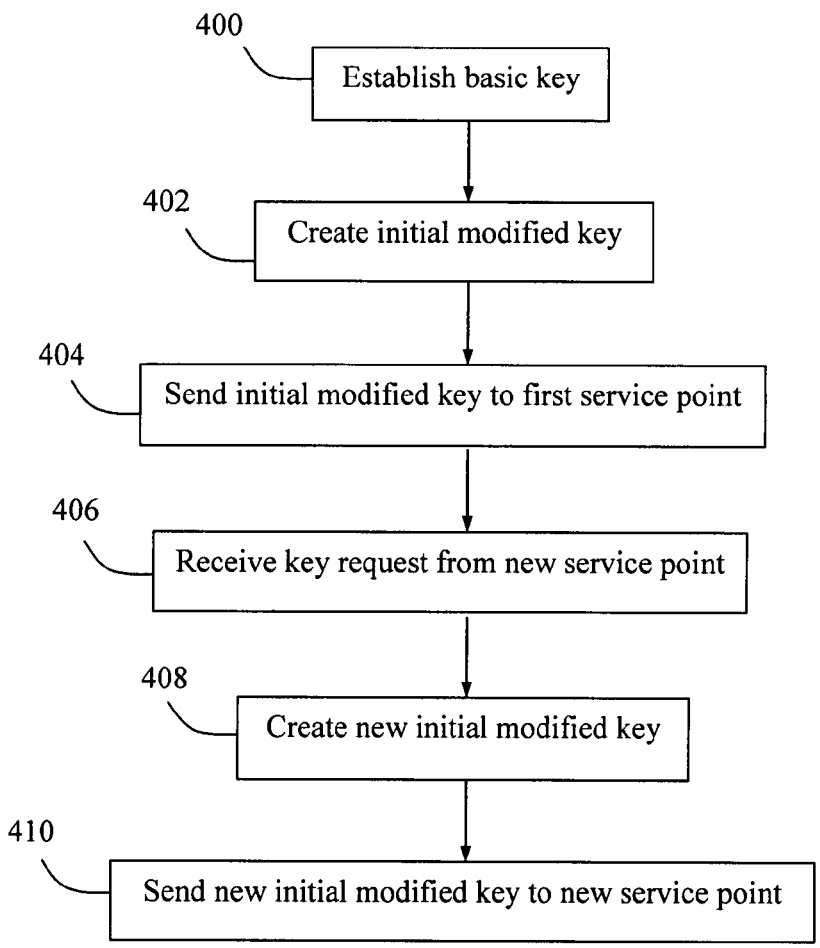
FIG. 4 is a flow chart illustrating a basic procedure of providing keys, as executed in a service control node, in accordance with another embodiment.

A basic procedure of providing keys for a terminal will now be described with reference to the flow chart illustrated in FIG. 4, as executed in a service control node in a communication network comprising a plurality of service points. Said keys can be used for protecting communication between the terminal and the service points. The keys and parameters occurring in the previous example of FIGS. 3A-C, are also used here.

In a first step 400, a basic key Ik is established for the terminal during a registration procedure when the terminal has entered the network.

In a next step 402, an initial modified key $Ik_1$ is created by applying a predetermined function f to at least the basic key and an initial value of a key version parameter v, when the terminal starts a first communication session.

In a next step 404, the initial modified key is sent to a first service point to which the terminal is initially attached, such that it can be used to protect communication between the terminal and the first service point.

In a next step 406, a key request is received from a new service point (x) to which the terminal is attached, e.g. when the terminal enters an active state after a period in idle state.

In a next step 408, a new initial modified key $Ik'_x$ is created by applying said function f to at least the basic key Ik and an updated value of said key version parameter v', when the terminal starts a second communication session.

In a final step 410, the new initial modified key is sent to the new service point, such that it can be used to protect communication between the terminal and the new service point.

Figure 5:
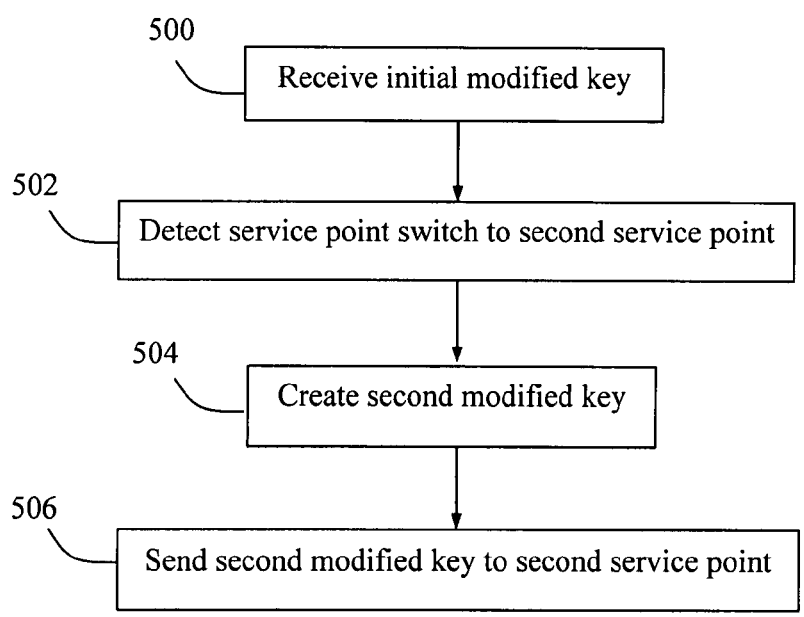
FIG. 5 is a flow chart illustrating a basic procedure of obtaining keys, as executed in a service point, in accordance with yet another embodiment.

A basic procedure of obtaining keys for a terminal will now be described with reference to the flow chart illustrated in FIG. 5, as executed in a first service point in a communication network. The terminal is initially attached to the first service point. The keys and parameters occurring in the previous example of FIGS. 3A-C, are also used here.

In a first step 500, an initial modified key $Ik_1$ is received from a service control node, that has been created by applying a predetermined first function f to at least a basic key Ik established for the terminal and an initial value of a key version parameter v.

In a next step 502, it is detected that the terminal will switch to a second service point during an ongoing session.

In a next step 504, a second modified key $Ik_2$ is created by applying a predetermined second function g to at least the initial modified key $Ik_1$.

In a final step 506, the second modified key $Ik_2$ is sent to the second service point, such that it can be used to protect communication between the terminal and the second service point.

Figure 6:
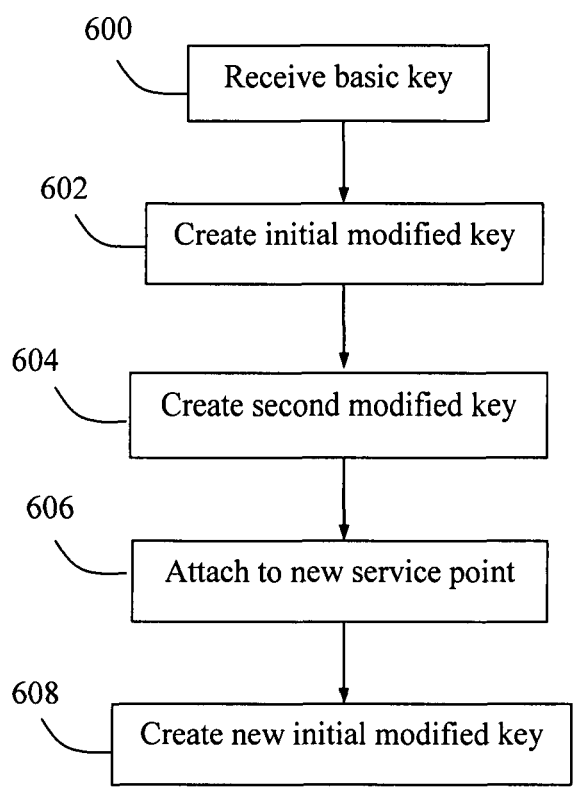
FIG. 6 is a flow chart illustrating a basic procedure of obtaining keys, as executed in a terminal, in accordance with yet another embodiment.

A basic procedure of obtaining keys for protecting communication between a terminal and service points in a communication network, will now be described with reference to the flow chart illustrated in FIG. 6, as executed in the terminal. The terminal is initially attached to a first service point in the network. The keys and parameters occurring in the previous example of FIGS. 3A-C, are also used here.

In a first step 600, a basic key Ik is determined during a registration procedure when entering the network.

In a next step 602, an initial modified key $Ik_1$ is created by applying a predetermined first function f to at least the basic key Ik and an initial value of a key version parameter v, when starting a first communication session, such that it can be used to protect communication with the first service point.

In a next step 604, a second modified key $Ik_2$ is created by applying a predetermined second function g to at least the initial modified key $Ik_1$, if the terminal switches to a second service point.

In a next step 606, the terminal attaches to a new service point x after an idle period in order to start a second communication session.

In a final step 608, a new initial modified key $Ik'_x$ is created by applying the first function f to at least the basic key Ik and an updated value of said key version parameter v', such that it can be used to protect communication with the new service point.

The service control node, service point and terminal described above in connection with FIGS. 4-6 may be provided with suitable means for executing the described steps in the flow charts shown in FIG. 4, FIG. 5 and FIG. 6, respectively.

By using the present solution, e.g. according to any of the described embodiments, a simple yet secure mechanism is obtained for handling keys for protecting communication between terminals and service points in a communication network. New keys are safely established whenever the terminal switches the service point, and no hand-over predictions are required. The number of keys that must be handled by base stations or other service points is also kept at a minimum. Reliable backward security when switching service points, and forward security when a terminal starts a session, can also be obtained with a minimum of service impact.

Although the embodiments described above have been mainly directed to the case of a mobile network, the present invention can be implemented in various different types of communication networks. For example, the invention can also be implemented in WiMAX/802.16, WLAN/802.11 and Flarion/802.20 (or 802.21).

While the invention has been described with reference to specific exemplary embodiments, the description is only intended to illustrate the inventive concept and should not be taken as limiting the scope of the invention. Various alternatives, modifications and equivalents may be used without departing from the invention, which is defined by the appended claims.

The invention claimed is:

1. A method, as executed in a service control node in a communication network comprising a plurality of service points, of providing keys for protecting communication between a terminal and said service points, the method comprising:
    establishing a basic key for the terminal and initializing a key version parameter corresponding to the terminal, to an initial value known by the service control node and the terminal, during a registration procedure when the terminal has entered the network;
    creating a modified key by applying a predetermined function to at least the basic key and the initial value of the key version parameter, when the terminal starts a communication session, said modified key thereby being created in the same way as it is created by the terminal;
    sending the modified key to a service point to which the terminal is attached, the modified key being usable to protect communication between the terminal and the service point;
    after creating said modified key, updating said value of said key version by applying a predetermined scheme or algorithm to the initial value of said key version, said value of said key version thereby being updated in the same way as it is updated by the terminal;
    receiving a key request from a key requesting service point to which the terminal is attached;
    creating a new modified key by applying said predetermined function to at least the basic key
    and said updated value of said key version parameter, said new modified key thereby being created in the same way as it is created by the terminal;
    sending the new modified key to the key requesting service point, the new modified key being usable to protect communication between the terminal and the key requesting service point, and
    after the new modified key is created, replacing said updated value of said key version parameter with a new value determined by applying the predetermined scheme or algorithm to said updated value, said key version parameter thereby being updated in the same way as it is updated by the terminal.

2. A method according to claim 1, wherein a service point identity of the service point or of the key requesting service point is also input to the predetermined function when creating the modified key or the new modified key, to make the modified key or the new modified key unique for a particular terminal/service point combination.

3. A method according to claim 1, wherein the initial value to which the key version parameter is initialised is zero, and the predetermined scheme or algorithm includes incrementing the value of the key version parameter by one each time the predetermined function is applied.

4. A method according to claim 1, wherein the key request is received when the terminal is reactivated after being idle.

5. A method according to claim 1, wherein the key request is received after the terminal has been active a preset time period, or has communicated a predetermined amount of data, or has made a predetermined number of service point switches.

6. An arrangement in a communication network comprising:
   a plurality of hardware service points;
   a service control node providing keys for protecting communication between a terminal and said service points, the service control node being configured to;
   establish a basic key for the terminal and initializing a key version parameter corresponding to the terminal, to an initial value known by the service control node and the terminal, during a registration procedure when the terminal has entered the network,
   create a modified key by applying a predetermined function to at least the basic key and the initial value of the key version parameter, when the terminal starts a communication session,
   send the modified key to a service point to which the terminal is attached, the modified key being usable to protect communication between the terminal and the service point,
   update said value of said key version to a new value obtained by applying a predetermined scheme or algorithm to the initial value of said key version, said value of said key version thereby being updated in the same way as it is updated by the terminal.
   receive a key request from a key requesting service point to which the terminal is attached;
   create a new modified key by applying said predetermined function to at least the basic key and said updated value of said key version parameter, said new modified key thereby being created in the same way as it is created by the terminal;
   sending the new modified key to the key requesting service point, the new modified key being usable to protect communication between the terminal and the key requesting service point, and
   after the new modified key is created, replacing said updated value of said key version parameter with a new value determined by applying the predetermined scheme or algorithm to said updated value, said key version parameter thereby being updated in the same way as it is updated by the terminal.

7. An The arrangement according to claim 6, wherein said service control node is further configured to input a service point identity of the service point or of the key requesting service point to the predetermined function when creating the modified key or the new modified key, to make the modified key or the new modified key unique for a particular terminal service point combination.

8. The arrangement according to claim 6, wherein the initial value to which the key version parameter is initialised is zero and the predetermined scheme or algorithm includes incrementing the key version parameter by one each time the predetermined function is applied.

9. A method, as executed by a first service point in a communication network, the method comprising:
   receiving a first modified key created by applying a predetermined first function to at least a basic key established for a terminal and a value of a key version parameter known by a service control node and the terminal, from the service control node;
   detecting that the terminal will switch to a second service point during an ongoing session;
   creating a second modified key by applying a predetermined second function to at least the first modified key, said second modified key thereby being created in the same way as it is created by the terminal;
   sending the second modified key to the second service point, the second modified key being usable to protect communication between the terminal and the second service point;
   after the second modified key is created, updating said value of said key version parameter, said value of said key version thereby being updated, with a new value determined by applying the predetermined scheme or algorithm to said updated value, said key version parameter thereby being updated in the same way as it is updated by the terminal.

10. The method according to claim 9, wherein the first service point or the second service point sends a key request to the service control node to obtain a new modified key.

11. The method according to claim 10, wherein the key request is sent when the terminal is reactivated after being idle.

12. The method according to claim 10, wherein the key request is sent after the terminal has been active a preset time period, or has communicated a predetermined amount of data, or has made a predetermined number of service point switches.

13. An arrangement in a communication network, comprising:
   a hardware service control node;
   a first service point obtaining keys for protecting communication with a terminal initially attached to the first service point, the first service point being configured to:
   receive a first modified key from the service control node, the first modified key having been created by applying a predetermined first function to at least a basic key established for the terminal and a value of a key version parameter known by the service control node and the terminal, said first modified key having being created in the same way as it is created by the terminal,
   detect that the terminal will switch to a second service point during an ongoing session,
   create a second modified key by applying a predetermined second function to at least the first modified key, said second modified key thereby being created in the same way as it is created by the terminal,
   send the second modified key to the second service point, the second modified key being usable to protect communication between the terminal and the second service point;
   the second service point configured to receive the second modified key; and
   after the second modified key is created, updating said value of said key version parameter, said value of said key version thereby being updated, with a new value determined by applying the predetermined scheme or algorithm to said updated value, said key version parameter thereby being updated in the same way as it is updated by the terminal.

14. The arrangement according to claim 13, wherein at least one of the first service point or the second service point is further configured to send a key request to the service control node to obtain a new modified key.

15. The arrangement according to claim 14, wherein said at least one of the first service point or the second service terminal is configured to send the key request when the terminal is reactivated after being idle.

16. The arrangement according to claim 14, wherein said at least one of the first service point or the second service terminal is configured to send the key request after the terminal has been active a preset time period, or has communicated a predetermined amount of data, or has made a predetermined number of service point switches.

17. A method, as executed by a terminal initially attached to a first service point in a communication network, of obtaining keys for protecting communication with service points in the network, the method comprising:

determining a basic key and initializing a key version parameter corresponding to the terminal, to an initial value known by a service control node and the terminal, during a registration procedure when entering the network;

creating a first modified key by applying a predetermined first function to at least the basic key and the initial value of the key version parameter, when starting a first communication session, the first modified key being usable to protect communication with the first service point;

creating a second modified key by applying a predetermined second function, which is different from the first function, to at least the first modified key, if the terminal switches to a second service point;

attaching to a new service point after an idle period in order to start a second communication session;

updating said value of said key version according to a predetermined scheme or algorithm based on a current value of said key version, wherein the current value is the initial value or a previously updated value;

creating a new modified key by applying said first function to at least the basic key and an updated value of said key version parameter, the new modified key being usable to protect communication with the new service point; and after the new modified key is created, replacing said updated value of said key version parameter with a new value determined by applying the predetermined scheme or algorithm to said updated value, said key version parameter thereby being updated in the same way as it is updated by the terminal.

18. A method according to claim 17, wherein a service point identity of the first service point or the second service point is also input to the predetermined first function when creating the first modified key or the new modified key, to make the first modified key or the new modified key unique for a particular terminal/service point combination.

19. A method according to claim 17, wherein the initial value to which the key version parameter is initialised is zero and the predetermined scheme includes incrementing the value of the key version parameter by one each time the first predetermined function is applied.

20. An arrangement in a communication network, comprising:

a hardware terminal obtaining keys for protecting communication with service points in the network, the terminal being initially attached to a first service point and being configured to:

determine a basic key and initializing a key version parameter to an initial value known by a service control node and the terminal, during a registration procedure when entering the network;

create a first modified key by applying a predetermined first function to at least the basic key and the initial value of the key version parameter, when starting a first communication session, the first modified key being usable to protect communication of the terminal with the first service point;

create a second modified key by applying a predetermined second function different from the first predetermined first function, to at least the first modified key, if the terminal switches to a second service point, the second modified key being usable to protect communication of the terminal with the second service point; and after the second modified key is created, updating said value of said key version parameter, said value of said key version thereby being updated, with a new value determined by applying the predetermined scheme or algorithm to said updated value, said key version parameter thereby being updated in the same way as it is updated by the terminal.

21. The arrangement according to claim 20, wherein the terminal is further configured to:

attach to a new service point after an idle period in order to start a second communication session;

update said value of said key version according to a predetermined scheme or algorithm based on a current value of said key version, wherein the current value is the initial value or a previously updated value, and create a new modified key by applying said first function to at least the basic key and an updated value of said key version parameter, the new modified key being usable to protect communication of the terminal with the new service point.

22. The arrangement according to claim 21, wherein the terminal is configured to also input a service point identity of the first service point or the new service point to the predetermined function when creating the modified key and/or the new modified key, to make the first modified key or the new modified key unique for a particular terminal service point combination.

23. The arrangement according to claim 21, wherein the initial value to which the key version parameter is initialised is zero, and the predetermined scheme or algorithm includes incrementing the value of the key version parameter by one each time the first predetermined function is applied.

* * * * *